No. 794,891. PATENTED JULY 18, 1905.
E. ROGERS & C. W. SAGEE.
GLASS MEASURING AND CUTTING MECHANISM.
APPLICATION FILED APR. 25, 1904.

4 SHEETS—SHEET 1.

WITNESSES:
W. W. Canby
M. M. Hamilton

INVENTORS
Ephraim Rogers &
Charles W. Sagee
BY
Harding & Harding
ATTORNEYS

No. 794,891. PATENTED JULY 18, 1905.
E. ROGERS & C. W. SAGEE.
GLASS MEASURING AND CUTTING MECHANISM.
APPLICATION FILED APR. 25, 1904.
4 SHEETS—SHEET 3.

WITNESSES:
INVENTORS
Ephraim Rogers
Helcarus W. Sagee
BY
Harding & Harding
ATTORNEYS No. 794,891. PATENTED JULY 18, 1905.
E. ROGERS & C. W. SAGEE.
GLASS MEASURING AND CUTTING MECHANISM.
APPLICATION FILED APR. 25, 1904.

4 SHEETS—SHEET 4.

WITNESSES:
H. H. Canby
M. M. Hamilton

INVENTORS
Ephraim Rogers &
Charles W. Sagee
BY
Harding & Harding
ATTORNEYS

No. 794,891.
Patented July 18, 1905.

UNITED STATES PATENT OFFICE.

EPHRAIM ROGERS AND CHARLES W. SAGEE, OF PHILADELPHIA, PENNSYLVANIA, ASSIGNORS TO HERO FRUIT JAR COMPANY, OF PHILADELPHIA, PENNSYLVANIA, A CORPORATION OF PENNSYLVANIA.

GLASS MEASURING AND CUTTING MECHANISM.

SPECIFICATION forming part of Letters Patent No. 794,891, dated July 18, 1905.

Application filed April 25, 1904. Serial No. 204,729.

*To all whom it may concern:*

Be it known that we, EPHRAIM ROGERS and CHARLES W. SAGEE, citizens of the United States, residing at Philadelphia, county of Philadelphia, and State of Pennsylvania, have invented a new and useful Improvement in Glass Measuring and Cutting Mechanism, of which the following is a full, clear, and exact description, reference being had to the accompanying drawings, which form a part of this specification.

Our invention is especially applicable as an adjunct or accessory to a glass-forming machine, and has for its object to provide a source of glass-supply from which automatically a fixed amount of glass will be fed into the molds.

We will first describe our invention as illustrated in the accompanying drawings and then point out the invention in the claims.

Figure 1:
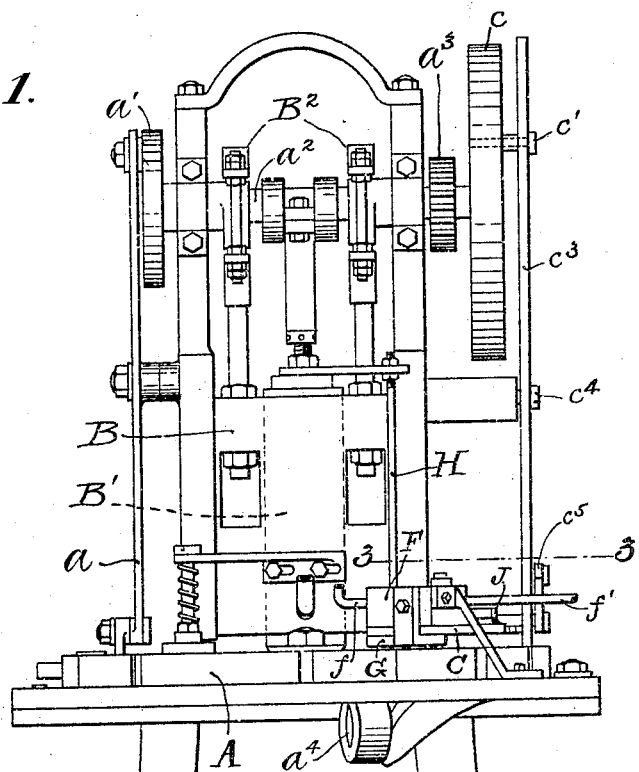
Figure 2:
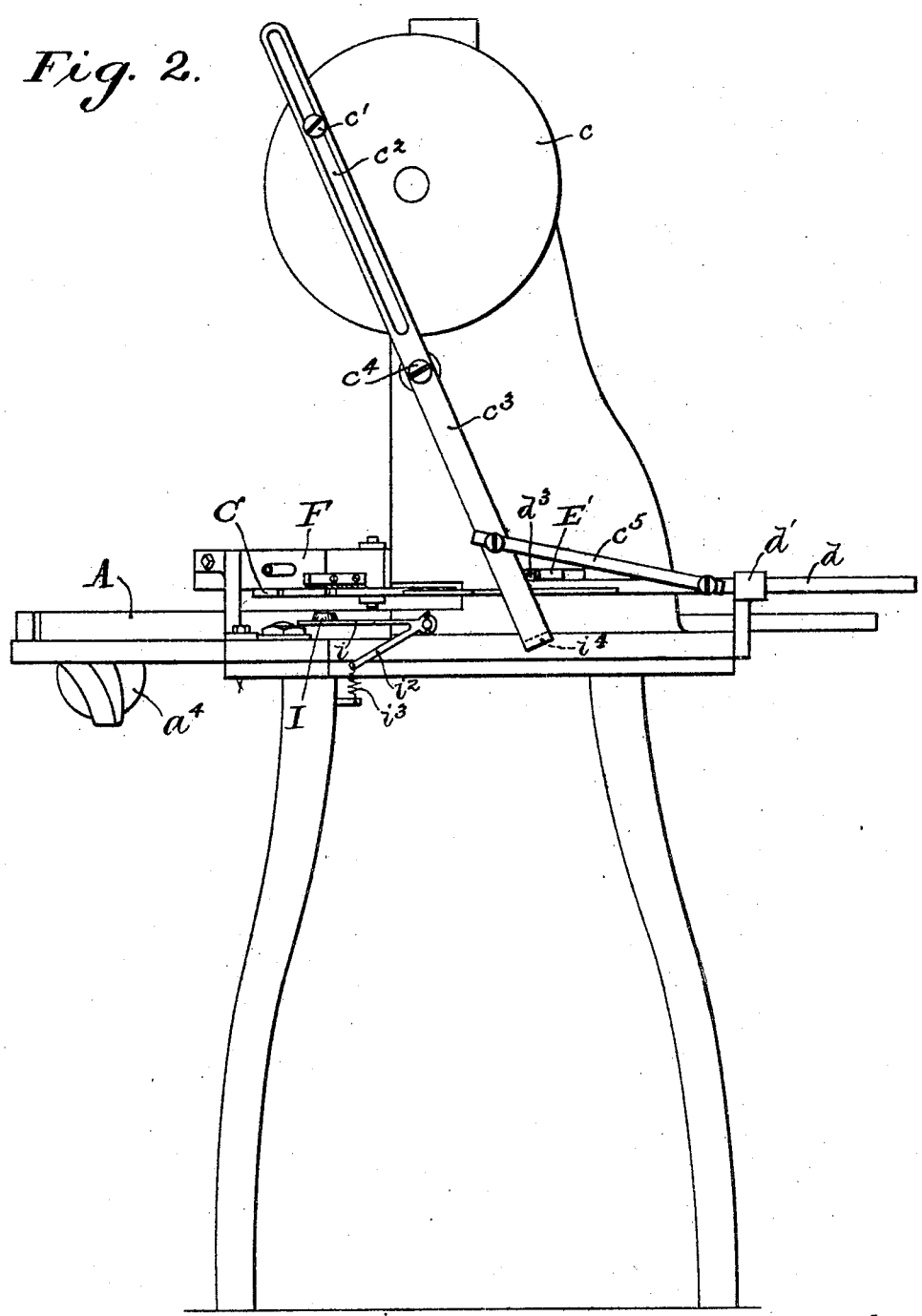
Figure 3:
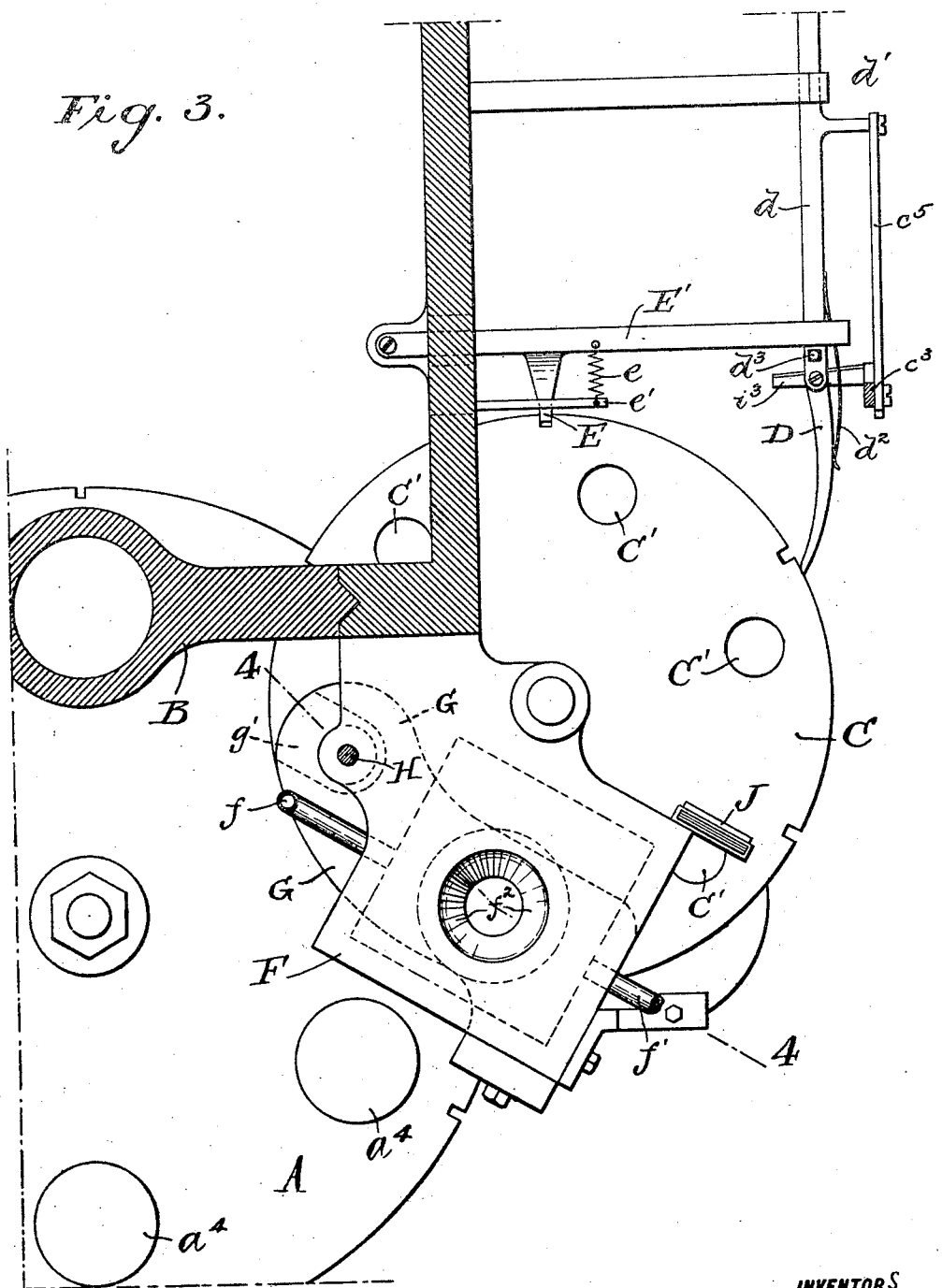
Figure 4:
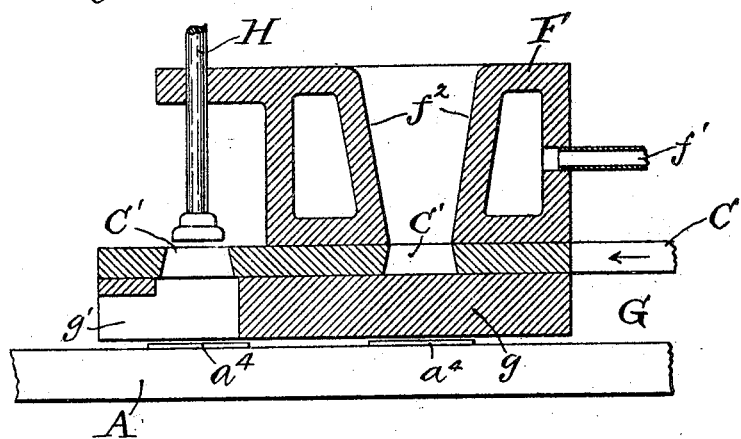
Figure 5:
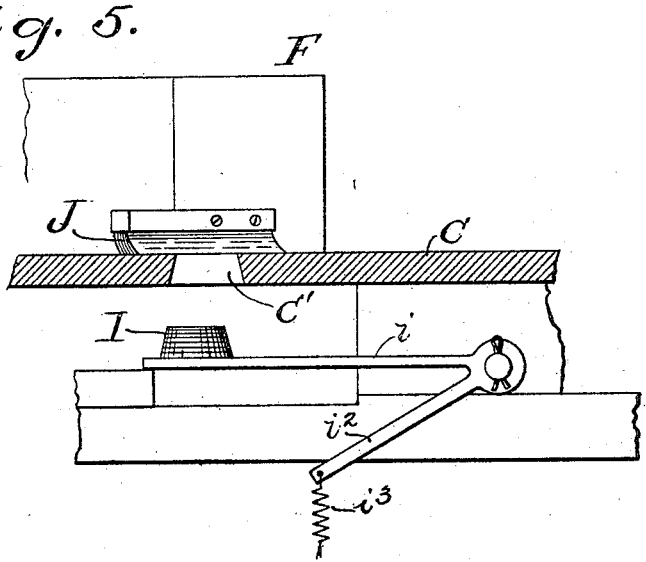

In the drawings, Figure 1 is a front view of a press, showing our invention. Fig. 2 is a side view. Fig. 3 is an enlarged detail plan as taken on the line 3 3, Fig. 1. Fig. 4 is an enlarged section taken on the line 4 4, Fig. 3. Fig. 5 is an enlarged detail of the wipers with the cutter in section.

As in the well-known glass-pressing machines, A is a rotary table, upon which are placed the molds $a^4$. The table A is operated in the well-known manner by a ratchet and pawl, (not shown,) the pawl being operated by means of a crank-rod $a$, operated by the crank-disk $a'$ on the shaft $a^2$, on which is the driving-gear $a^3$.

B is the main plunger, and B' the supplemental pressing-plunger. The plungers are operated by the eccentrics $B^2$.

C is a rotary table having near the periphery the orifices C'. The upper surface of the table at the orifices C' is provided with a knife-edge or cutting-surface. This table is rotated in unison with the main mold-table A in the following manner: Upon the shaft $a^2$ is the crank-disk $c$, having on its face the crank-pin $c'$. This crank-pin $c'$ rests in the slotted portion $c^2$ of the crank-rod $c^3$, pivoted at $c^4$ to the frame of the machine. By means of the link $c^5$ this crank-rod $c^3$ is connected to the pawl-arm $d$, having at its outer end the pawl D, pivoted thereto. The pawl-arm $d$ moves in a guide $d'$, secured to the frame of the machine. A spring $d^2$, secured to arm $d$, acts upon the pawl D. $d^3$ is a projection upon the arm $d$. On the surface of the table are the serrations, in which the pawl D is adapted to work.

E is a locking-pin connected to the rod or arm E', pivoted to the machine.

$e$ is a spring connected at one end to bracket $e'$, projecting from the frame of the machine, and at the other end to the arm E', so that it tends at all times to force arm E' and pin E forward.

With the pawl D in engagement with one of the serrations the crank-disk $c$ in its rotation will first move the table C a distance equal to the movement of the main mold-table between molds, when the pin E' will enter a serration and hold the table fixed. In the reverse movement of the arm and pawl the projection $d^3$ strikes the rod E', moving the locking-pin E out of engagement. The initial forward movement of the pawl D will move the table sufficiently to present the unserrated face to the pin E.

F is a hollow block having the liquid-inlet $f$ and the liquid-outlet $f'$. Through this block is formed an inclined or tapered orifice $f^2$, forming an open-ended hopper. The lower surface of the block surrounding the orifice $f^2$ is formed with a cutting edge or surface. The walls of this orifice may be lined with asbestos, if desired. This block F is fixedly supported from the frame of the machine, so as to be in contact with the table C, and in the rotation of the table C the orifices C' register with the orifice $f^2$ in the block F. Beneath the table C is a plate G, having a solid portion $g$ and an orificed portion $g'$, the solid portion being opposite the orifice $f^2$ in block F.

H is a plunger connected by rod to main plunger B, so as to move in unison therewith. This plunger H is in line with orificed portion $g'$ of plate G.

The operation is as follows: The hopper $f^2$ is filled with molten glass. As the bottom of this hopper is formed by the table C, wherever in the rotation of the table an orifice C' is opposite said hopper the glass in the hopper will pass into said orifice. The glass is prevented from passing out of orifice C' by reason of the solid portion of plate G. Therefore as each orifice C' passes beneath the mouth of hopper $f^2$ it will receive a measured amount of glass, which will be that of the size of the orifice C'. The glass in the table-orifice in the further movement of the table C will be sheared or separated from the remainder of the glass in the hopper $f^2$ by the knife or cutting edges on the table and hopper. When the table C rotates so that the last-mentioned orifice C' is in line with orifice $g'$ in plate G, the glass will fall through said plate into the mold $a^4$ beneath it on the main mold-table A. If there should be any tendency of the glass to stick, the plunger H will force the glass therein through.

In order to provide means to keep the upper surface and interior of the table C at the orificed portion C' moist, we provide the following mechanism: I is a pad secured to the pivoted arm $i$, having the tailpiece $i^2$, acted on by spring $i^3$. Connected to the crank-rod $c^3$ is a projection $i^4$, which in the movement of the crank-rod strikes the arm $i$, forcing the arm upward and the pad being in line of movement of and corresponding in size to the orifice C' is forced into it, the spring returning it to its initial position after the passing of the projection.

Resting upon the upper surface of the table C in line of movement of the orificed portion is a brush or absorbent body J, which in the movement of the table travels over the knife surface or edge of the orifices C', and thus they may be kept in proper condition.

As may be seen, with our improved device all that is necessary is to keep the hopper full of glass, and thereafter automatically a fixed amount of glass will be fed from the hopper, sheared or separated from the remainder of the glass in the hopper and delivered into the pressing-mold.

Having now fully described our invention, what we claim, and desire to protect by Letters Patent, is—

1. In a machine of the character described, in combination, a table having a plurality of orifices, means to rotate said table, and an open-ended hopper, with which the orifices in the table are adapted to register.

2. In a machine of the character described, in combination, a table having a plurality of orifices, means to rotate said table, and an open-ended hopper with which the orifices in the table are adapted to register, said hopper, at its discharge end, having a knife or cutting edge.

3. In a machine of the character described, in combination, a table, having a plurality of orifices, means to rotate said table and an open-ended hopper with which the orifices in the table are adapted to register, said table, at the upper end of each orifice having a knife, or cutting edge.

4. In a machine of the character described, in combination, a table, having a plurality of orifices, means to rotate said table, and an open-ended hopper with which the orifices in the table are adapted to register, said hopper and orifices at the point of contact having a knife or cutting edge.

5. In a machine of the character described, in combination, an orificed table, means to move said table, an open-ended hopper with which the orifice in the table is adapted to register, and a plate beneath said table having a solid portion and an orificed portion.

6. In a machine of the character described, in combination, an orificed table, means to move said table, an open-ended hopper with which the orifice in the table is adapted to register, and a plate beneath said table having a solid portion and an orificed portion, there being a cutting edge at the point of contact of the hopper and table-orifices.

7. In a machine of the character described, in combination, an orificed table, means to move said table, an open-ended hopper with which the orifice in the table is adapted to register, and a plate beneath said table having a solid portion and an orificed portion, the solid portion being in line with the hopper.

8. In a machine of the character described, in combination, an orificed table, means to move said table, an open-ended hopper with which the orifice in the table is adapted to register, and a plate beneath said table having a solid portion and an orificed portion, the solid portion being in line with the hopper, there being a cutting edge at the point of contact of the hopper and table-orifices.

9. In a machine of the character described, in combination, an orificed table, means to move said table, an open-ended hopper with which the orifice in the table is adapted to register, a plate beneath said table having a solid portion and an orificed portion, a plunger in line with said orificed portion of the plate, and means to give said plunger a vertical movement.

10. In a machine of the character described, in combination, an orificed table, means to move said table, an open-ended hopper with which the orifice in the table is adapted to register, and a plate beneath said table having a solid portion and an orificed portion, a plunger in line with said orificed portion of the plate, and means to give said plunger a vertical movement, there being a cutting edge at the point of contact of the hopper and table-orifices.

11. In a machine of the character described, in combination, an orificed table, means to move said table, an open-ended hopper with which the orifice in the table is adapted to register, a plate beneath said table having a solid portion and an orificed portion, and a main rotating table carrying a plurality of molds, said molds, in the rotation of the table, alining with the orificed portion of the plate.

12. In a machine of the character described, in combination, an orificed table, means to move said table, an open-ended hopper with which the orifice in the table is adapted to register, a plate beneath said table having a solid portion and an orificed portion, a main rotating table carrying a plurality of molds, said molds, in the rotation of the table, alining with the orificed portion of the plate, there being a cutting edge at the point of contact of the hopper and table-orifices.

13. In a machine of the character described, in combination, an orificed table, means to rotate said table, an open-ended hopper, with which the orifices in the table are adapted to register, and a water-jacket surrounding said hopper.

14. In a machine of the character described, in combination, an orificed table, means to rotate said table, an open-ended hopper with which the orifices in the table are adapted to register, said hopper, at its discharge end, having a knife or cutting edge, and a water-jacket surrounding said hopper.

15. In a machine of the character described, in combination, a rotary orificed table, a pad adapted to contain oil or other liquid, and a pivoted arm to which said pad is connected, said pad, in the movement of the arm, entering the orifice in the table.

16. In a machine of the character described, in combination, a rotary orificed table, a pad adapted to contain oil or other liquid, a pivoted arm to which said pad is connected, said pad, in the movement of the arm, entering the orifice in the table, and a spring acting on said arm to hold it free from said orifice.

17. In a machine of the character described, in combination with a table having orifices spaced around the same, a pad, and an arm to which said pad is connected, said arm being pivoted so as to swing in line with the orificed portion of the table.

18. In a machine of the character described, in combination with a table having orifices spaced around the same, a pad, an arm to which said pad is connected, said arm being pivoted so as to swing in line with the orificed portion of the table, and a spring acting on said arm to hold it free from said orifice.

19. In a machine of the character described, in combination, with a table provided with orifices spaced around the same, means to intermittently move said table, a pad, a pivoted arm to which said pad is connected, an orifice in said table being in line of movement of said pad, when said table is at rest, and means to move said arm when said table is at rest.

20. In a machine of the character described, in combination, with a table provided with orifices spaced around the same, means to intermittently move said table, a pad, a pivoted arm to which said pad is connected, an orifice in said table being in line of movement of said pad, when said table is at rest, and means to move said arm at the end of each intermittent movement of the table.

In testimony of which invention we have hereunto set our hands, at Philadelphia.

EPHRAIM ROGERS.
CHARLES W. SAGEE.

Witnesses:
F. M. BROWER,
JOSEPH RILING.